United States Patent
Lamela et al.

(10) Patent No.: US 6,761,234 B1
(45) Date of Patent: Jul. 13, 2004

(54) SKID STEER VEHICLE WITH STEERABLE SUSPENSION

(75) Inventors: Anthony J. Lamela, Gilberts, IL (US); Brian E. Felsing, Park Ridge, IL (US); Troy D. Bateman, Plainfield, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 10/606,614

(22) Filed: Jun. 26, 2003

(51) Int. Cl.$^7$ ............................................. B62D 11/04
(52) U.S. Cl. ....................... 180/6.3; 280/124.12; 280/8; 180/6.48
(58) Field of Search ................ 180/6.2, 6.3, 6.48, 180/408, 414, 417, 419; 280/124.128, 124.153, 124.13, 124.134

(56) References Cited

U.S. PATENT DOCUMENTS

| | | | | |
|---|---|---|---|---|
| 3,808,813 A | * | 5/1974 | Spinks | 60/486 |
| 4,072,009 A | * | 2/1978 | Daschievici et al. | 60/484 |
| 4,074,782 A | * | 2/1978 | Bauer | 180/6.48 |
| 6,513,614 B2 | * | 2/2003 | Knutson et al. | 180/242 |
| 6,568,696 B2 | * | 5/2003 | Osborn et al. | 280/93.5 |
| 6,578,358 B1 | * | 6/2003 | Schuh | 60/448 |
| 2002/0070071 A1 | * | 6/2002 | Schuh | 180/421 |
| 2002/0070727 A1 | * | 6/2002 | Osborn et al. | 324/174 |
| 2004/0032107 A1 | * | 2/2004 | Timoney et al. | 280/124.128 |

* cited by examiner

*Primary Examiner*—Lesley D. Morris
(74) *Attorney, Agent, or Firm*—John William Stader; Collin A. Webb (57) ABSTRACT

A skid steer vehicle with steerable suspension has hydraulic motors coupled to four steerable wheels. The wheels are turned by hydraulic actuators and the vehicle is steered either by turning the wheels or by driving the wheels on opposite sides of the vehicle in opposite directions and skid steering the vehicle.

19 Claims, 6 Drawing Sheets

FIG. 7 ized vehicle that was capable of carrying an implement mounted on loader arms. Skid steer loaders are typically small vehicles, on the order of 10 to 14 feet long that rest on four or more wheels, at least two of which being disposed on each side of the vehicle.

SKID STEER VEHICLE WITH STEERABLE SUSPENSION

FIELD OF THE INVENTION

The invention relates generally to skid steer vehicles and, more particularly, it relates to steerable suspensions for such vehicles.

BACKGROUND OF THE INVENTION

Skid steer loaders were first invented about 30 years ago to fill a need for a small highly maneuverable vehicle that was capable of carrying an implement mounted on loader arms. Skid steer loaders are typically small vehicles, on the order of 10 to 14 feet long that rest on four or more wheels, at least two of which being disposed on each side of the vehicle.

In order to turn these vehicles, the wheels on opposing sides of the skid steer loader are driven at different speeds. This causes the faster moving wheels on one side to advance that side over the ground faster than the other side on slower moving wheels. The effect is to turn the vehicle toward the wheels on the slower moving side. Since the wheels are not turnable with respect to the vehicle, the vehicle turns by skidding slightly, hence the name "skid steer loader." In the extreme case the wheels on one side of the vehicle not only rotate slower than the wheels on the other side of the vehicle but can turn in the opposite direction. When this mode of operation is selected, the skid steer loader will rotate in place about a vertical and generally stationary rotational axis. This mode of operation requires the greatest amount of wheel skidding and as a consequence creates deep ruts in the soft dirt of construction sites and rapidly wears the tires. If the wheels are driven at the same speed but in opposite directions, the skid steer loader will appear to rotate generally about the center of the vehicle.

This ability to change direction by rotating about an axis within the footprint or perimeter of the loader itself was the primary reason why the skid steer loader achieved its great success.

While steering by skidding is essential to a skid steer vehicle, it is not satisfactory under all circumstances. Skid steering while driving over the road, for example, is awkward. First, skidding on pavement causes excessive wear of the tires, as compared to skidding on the soft soil of a work site. Second, when a typical skid steer vehicle is skid steered on pavement, the wheels tend to alternately grab and release, causing the vehicle to buck and wheels to hop, a condition that is unpleasant for the operator.

What is needed, therefore, is a skid steer vehicle that is capable of steering not only by skidding, but by steering the wheels with respect to the chassis. It is an object of this invention to provide such a vehicle.

SUMMARY OF THE INVENTION

In accordance with a first aspect of the invention, a skid steer vehicle is provided, including a chassis having a right side, a left side, a front end, and a rear end; an engine mounted on the chassis; two steerable front wheels operably connected to the front end of the chassis, wherein one of the two steerable front wheels is on the right side of the chassis and another of the two steerable front wheels is on the left side of the chassis; two steerable rear wheels operably connected to the rear end of the chassis, wherein one of the two steerable rear wheels is on the right side of the chassis and another of the two steerable rear wheels is on the left side of the chassis; at least one steering actuator operably connected to the four steerable front and rear wheels to steer the wheels with respect to the chassis; at least one hydraulic drive motor operably connected to at least one of the right side wheels; at least another hydraulic drive motor operably connected to at least one of the left side wheels; a first hydraulic circuit configured to operate the at least one and the at least another hydraulic drive motors, wherein the first hydraulic circuit is operable (1) to simultaneously drive the at least one hydraulic drive motor in a forward direction and the at least another hydraulic motor in a backward direction, (2) to simultaneously drive the at least one and the at least another hydraulic motors in a forward direction, and (3) to simultaneously drive the at least one and the at least another hydraulic motors in a backward direction; and a second hydraulic circuit configured to drive the at least one steering actuator to a first position and to a second position, wherein in the first position the two steerable front wheels are turned left and the two steerable rear wheels are turned right, and wherein in the second position the two steerable front wheels are turned right and the two steerable rear wheels are turned left.

The at least one steering actuator may include four steering actuators, each of the four steering actuators being coupled to a corresponding one of the four steerable wheels. The four steering actuators may be hydraulic cylinders.

The hydraulic motors may include four hydraulic motors, each of the four hydraulic motors being drivingly coupled to a corresponding one of the four steerable wheels.

The skid steer vehicle may include four gear reduction units, each of the four gear reduction units being drivingly coupled to an associated one of the four steerable wheels.

The skid steer vehicle may include four wheel hubs drivingly coupled to each of the four steerable wheels and further wherein each of the four gear reduction units is disposed in a corresponding one of the four wheel hubs.

The skid steer vehicle may include four steering knuckles each of the four knuckles being coupled to and steerably supporting one of the four steerable wheels.

The skid steer vehicle may include two forward control arms disposed on opposing sides of the chassis, each of the forward arms having a fixed end pivotally coupled to the chassis and a free end extending forward from the fixed end; two rear control arms disposed on opposing sides of the chassis, each of the rear control arms having a fixed end pivotally coupled to the chassis and a free end extending rearward from the fixed end; and four steering knuckles, each knuckle coupled to a corresponding free end of the four control arms, wherein each of the four wheels are steerably coupled to a corresponding one of the steering knuckles.

In accordance with a second aspect of the invention, a skid steer vehicle is provided, including a chassis having a right side, a left side, a front end, and a rear end; an engine mounted on the chassis; four independent suspensions coupled to the chassis wherein the four independent suspensions include: a laterally extending torsion bar having a first end coupled to the chassis and a second end; a control arm having first and second ends and extending fore-and-aft along the vehicle chassis, and being coupled at the first end of the arm to the chassis and to the second end of the torsion bar; a steering knuckle coupled to the second end of the control arm, and a wheel coupled to the steering knuckle.

The skid steer vehicle may include a first hydraulic motor drivingly coupled to a first pair of the four wheels that are disposed on the right side of the vehicle; and a second hydraulic motor drivingly coupled to a second pair of the four wheels that are disposed on the right side of the vehicle.

The skid steer vehicle may include a drive controller operably coupled to the at least a first and the at least a second hydraulic motors (1) to simultaneously drive the first and second pair of wheels forward, (2) to simultaneously drive the first and second pairs of wheels in reverse, and (3) to simultaneously drive the first pairs of wheels forward and the second pair of wheels in reverse.

The drive controller may be configured to (1) steer a front pair of the four wheels to the left and to steer a rear pair of the four wheels to the right, and (2) to steer the front pair of the four wheels to the right and to steer the rear pair of the four wheels to the left.

A front two of the four control arms may be pivotally coupled to the chassis on opposing sides of the vehicle and extend horizontally forward to their respective second ends and a rear two of the four control arms may be pivotally coupled to the chassis on opposing sides of the vehicle and extend rearward to their respective second ends.

The skid steer vehicle may include four gear reduction units, each of the four gear reduction units being rotationally coupled to a corresponding one of the four wheels.

Each of the four gear reduction units may be coupled to a corresponding one of the four steering knuckles to be steered thereby.

BRIEF DESCRIPTION OF THE DRAWINGS

The drawings illustrate the best mode presently contemplated for carrying out the invention.

DETAILED DESCRIPTION OF THE INVENTION

Figure 1:
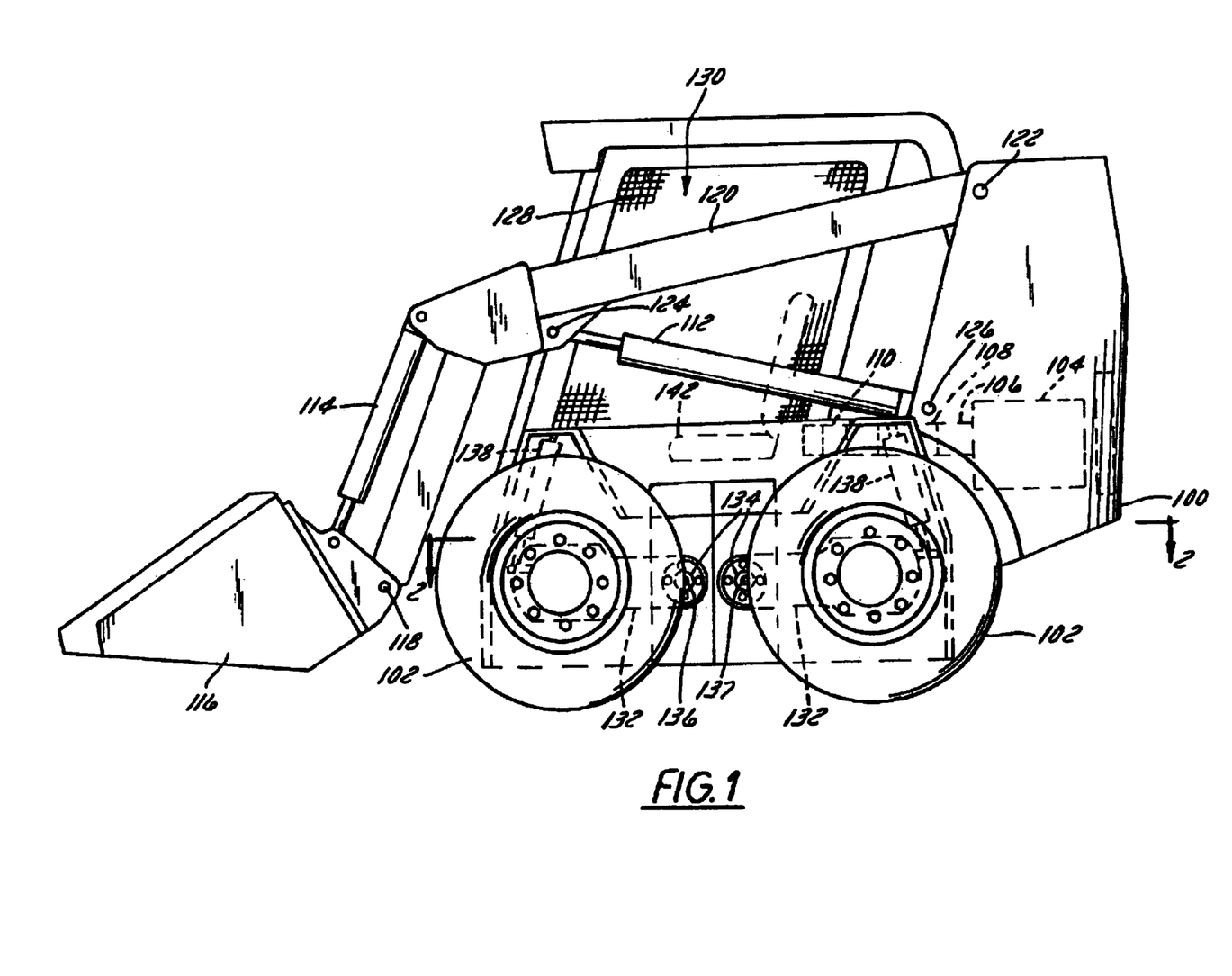
FIG. 1 is a side view of a skid steer vehicle in accordance with the present invention.
Figure 2:
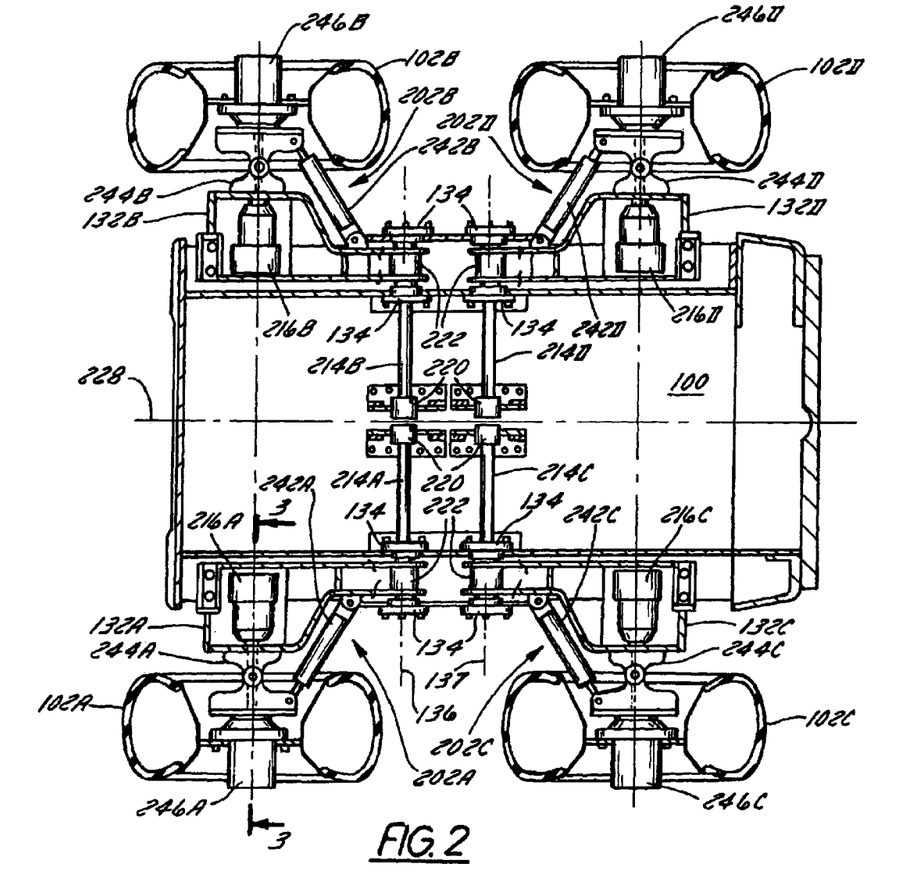
FIG. 2 is a top view of the skid steer vehicle in partial cross section taken at line 2—2 in FIG. 1 showing the arrangement of steerable suspensions with respect to the wheels.

FIG. 1 is a side view of a skid steer loader having a sprung suspension system. The loader includes a chassis 100 to which four wheels 102 are connected, two wheels on each side. In this view, only two wheels are shown. There are two wheels In identical position on the other side of the vehicle, as shown in FIG. 2. An engine 104 is coupled to and drives two hydraulic pumps 106 and 108. These pumps provide hydraulic fluid to the hydraulic drive motors (not shown in FIG. 1) that turn the wheels 102. A third hydraulic pump 110 is provided as a source of pressurized hydraulic fluid that is applied to lift cylinders 112 and bucket cylinders 114. The lift cylinders 112 are pivotally coupled to and between the chassis and the loader arms 120 to lift the loader arms with respect to the vehicle. Bucket cylinders 114 are coupled to and between the loader arms 120 and a bucket 116 to tilt the bucket with respect to the loader arms. Bucket 116 is pivotally coupled to loader arms 120 at pivot joint 118. It pivots about a substantially horizontal axis with to the loader arms when cylinder 114 is retracted or extended. In a similar fashion, loader arms 120 are pivotally coupled to chassis 100 at pivot joints 122 such that the loader arms raise and lower whenever the cylinders 112 extend and retract respectively. The lift cylinder 112 is pivotally coupled both to the loader arms and to the chassis at pivot joints 124 and 126, respectively. A heavy duty cage 128 called a ROPS extends about the operator's compartment 130 and prevents the operator from being injured in the event of a roll over or from material falling from the bucket when it is raised.

Each of the four wheels 102 is pivotally connected to one end of an associated control arm 132 (identified, herein as control arms 132A, 132B, 132C, and 132D). The control arms are connected at their other ends to chassis 100 by a pair of spherical bearings 134. These two spherical bearings are spaced apart and thus prevent the control arm from twisting with respect to the vehicle. The spherical bearings define pivotal axes 136, 137 that extend laterally with respect to chassis 100 of the loader. These pivotal axes are the axes about which control arms 132A–D pivot with respect to the vehicle. Each control arm is damped by a pair of hydraulic cylinders 138 that are coupled at their lower ends to the control arm and at their upper ends to chassis 100. Whenever control arms 132A–D pivot about their pivotal axes 136, 137 with respect to chassis 100, hydraulic cylinders 138 damp the motion of the control, arms. These hydraulic cylinders are fluid-filled using hydraulic fluid, gas or a combination of the two. They may be self-contained shock absorbers, or may include one or more external connections to a separate supply of hydraulic fluid and/or gas. The hydraulic cylinders may be used as springs to support their associated wheels. In a preferred embodiment, the hydraulic cylinder 138 includes an internal or external gas-charged accumulator that forces the hydraulic cylinders 138 into an extended position. In this position, the gas charge together with the hydraulic cylinders acts as a spring to support the vehicle on the control arms. This arrangement may supply the total springing for the vehicle, or it may be supplemented (or replaced by) the torsion bars described below.

Engine 104 is preferably a two- to six-cylinder internal combustion engine, preferably a diesel engine, and is preferably disposed such that its crankshaft extends parallel to the longitudinal extent of chassis 100.

Pumps 106, 108, and 110 preferably are coupled together in series and to engine 104. In this preferred arrangement, the pump shafts are rotationally coupled to the crankshaft of engine 104 and rotate about the same axis of rotation as that of the crankshaft. Pivot joints 122 and 126 are also located behind the operator seat 142 in operator's compartment 130.

Two forward control arms 132A, 132B are pivotally coupled to the chassis at their rear ends to pivot about a horizontal axis that extends from side-to-side with respect to the vehicle. These control arms extend forward and substantially horizontally. The front ends of these control arms are coupled to the front wheels of the vehicle to support the vehicle and to permit the front wheels to rotate about their central axes. The forward control arms 132A,B are configured to maintain the wheels' axes of rotation at the same height as the forward control arms' pivotal axes 136.

Two rear control arms 132C, 132D are pivotally coupled to the chassis at their forward ends to pivot about a horizontal axis that extends from side-to-side with respect to the vehicle. These control arms extend rearward and substantially horizontally. The rear ends of these rear control arms are coupled to the rear wheels of the vehicle to support the vehicle and to permit the rear wheels to rotate about their central axes. The rear control arms 132C,D are also configured to maintain the wheels axes of rotation at the same height as the control arms' pivotal axes 137.

We refer now to FIG. 2, which show the different elements that comprise four independent suspensions 202A, 202B, 202C, and 202D and the manner in which they are coupled to the chassis 100. Two of the four suspensions 202A, 2028 are front-end suspensions disposed on the left and right sides, respectively, of the chassis. The other two of the four suspensions are rear end suspensions 202C, 202D disposed on the left and right sides, respectively, of the chassis.

Each of the four independent suspensions 202A, B, C, D may include a spring (here shown as torsion bar 214), a control arm 132, a hydraulic drive motor 216, a steering knuckle 244 and a gear reduction unit 246. As described above, the springing provided by the torsion bar may be supplemented or replaced by hydraulic cylinder 138 if the cylinders are configured as springs.

The control arm is pivotally coupled to the vehicle chassis by the spherical bearings 134, the steering knuckle and hydraulic motor are coupled to the free end of the control arm, and the reduction gear unit is coupled to the outer pivotal portion of the steering knuckle. The wheels 102 are connected to the steering knuckle and pivot with respect to the free end of the control arm.

The four torsion bars 214 extend laterally with respect to the skid steer vehicle, having a fixed end 220 and a free end 222. The fixed end 220 of the torsion bar is fixed to the chassis 100. The free end 222 of the torsion bar is fixed to its associated control arm 132 at the spherical bearings 134. As a result, when a control arm 132 pivots with respect to the chassis, this pivoting twists the free end 222 of its associated torsion bar 214. The resistance of the torsion bar to this twisting provides the springing for each suspension.

The two front torsion bars 214 A, B are co-axial, sharing a common longitudinal and rotational axis. This axis is preferably coaxial with forward control arm rotational axis 136. The two torsion bars 214C, D that are associated with the rear suspensions are similarly coaxial, sharing a common longitudinal and rotational axis. This axis is preferably coaxial with rear control arm rotational axis 137. Each torsion bar 214 extends from its associated control arm inward almost to the longitudinal centerline 228 of the vehicle.

The rotational axes of the front wheels 102A, B are coaxial when their respective control arms 132A, B are in the same pivotal position and the wheels point straight ahead. The rotational axes of the rear wheels 102C, D are also coaxial when the rear control arms 132C, D and the rear wheels are in the same pivotal position. It should be recognized, of course, that when the suspensions on either side of the vehicle flex up or down with respect to the suspensions on the other side of the vehicle, the front and rear control arms will be flexed away from this coaxial relationship. However, when the vehicle is stationary and the control arms are in the same pivotal position with respect to chassis, they are co-axial.

Figure 3:
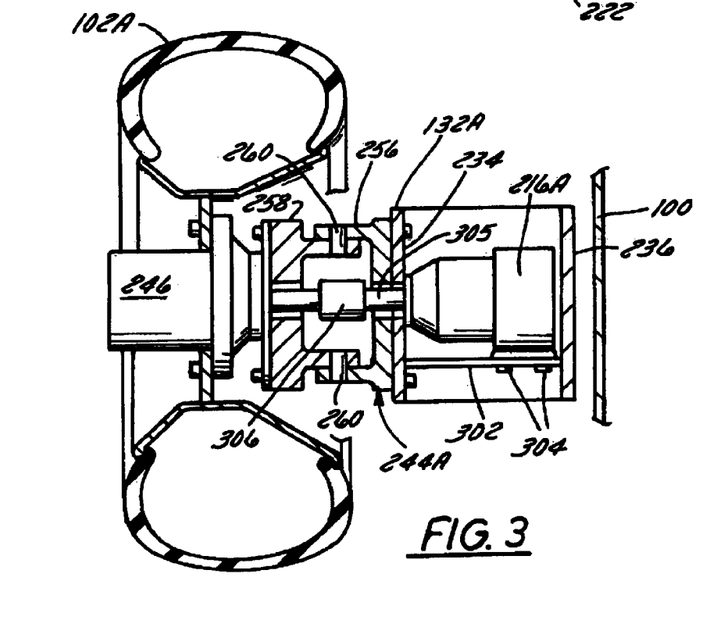
FIG. 3 is a cross sectional view of the left front suspension of FIG. 2 taken at section line 3—3 in FIG. 2.
Figure 4:
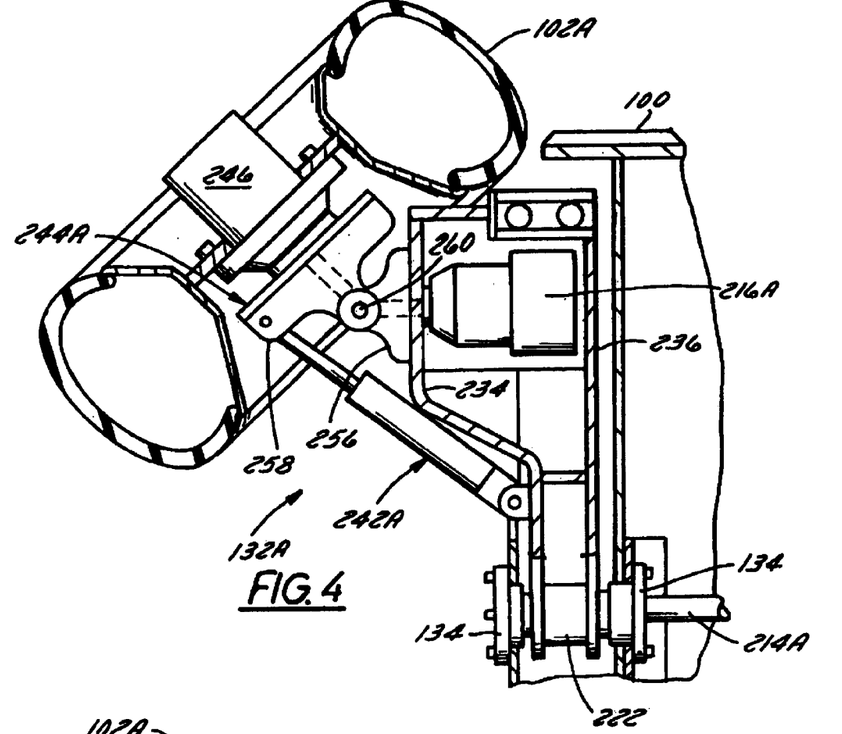
FIG. 4 is a fragmentary detail view of the left front suspension with its wheel pivoted to the right.

Referring to FIGS. 2–4, each control arm is comprised of at least two spaced apart plates 234 and 236 that extend generally perpendicular to the ground and define a space therebetween in which a hydraulic drive motor 216 is received and supported. A mounting plate 302 (as best shown in FIG. 3) is welded between the two spaced apart plates 234 and 236. The hydraulic drive motor 216 is mounted on mounting plate 302 with bolts 304.

Each steering knuckle 244 is coupled to plate 234 at its inner portion 256 and is thereby supported by the control arm 132. Each of the four steering knuckles 244 has an inner portion 256 and outer portion 258. The inner and outer portions 256 and 258 of each steering knuckle are pivotally coupled to one another by a pair of linch pins 260 as best depicted in FIG. 3. Each wheel 102 is thereby constrained to pivot about a generally vertical axis defined by its associated linch pins 260. The steering knuckle 244 therefore has a single rotational degree of freedom defined by the linch pins 260.

Gear reduction unit 246 is mounted to outer portion 258 of the steering knuckle 244 and has internal gearing that provide a gear reduction ratio that is preferably between 10:1 and 30:1. The gear reduction ratio is the ratio of the speed at which motor 216 drives the unit to the speed of rotation of wheel 102. Gear reduction unit 246 is driven by motor 216. Output shaft 305 of motor 216 is coupled to and drives constant velocity joint 306, which is coupled to and drives gear reduction unit 246.

Figure 7:
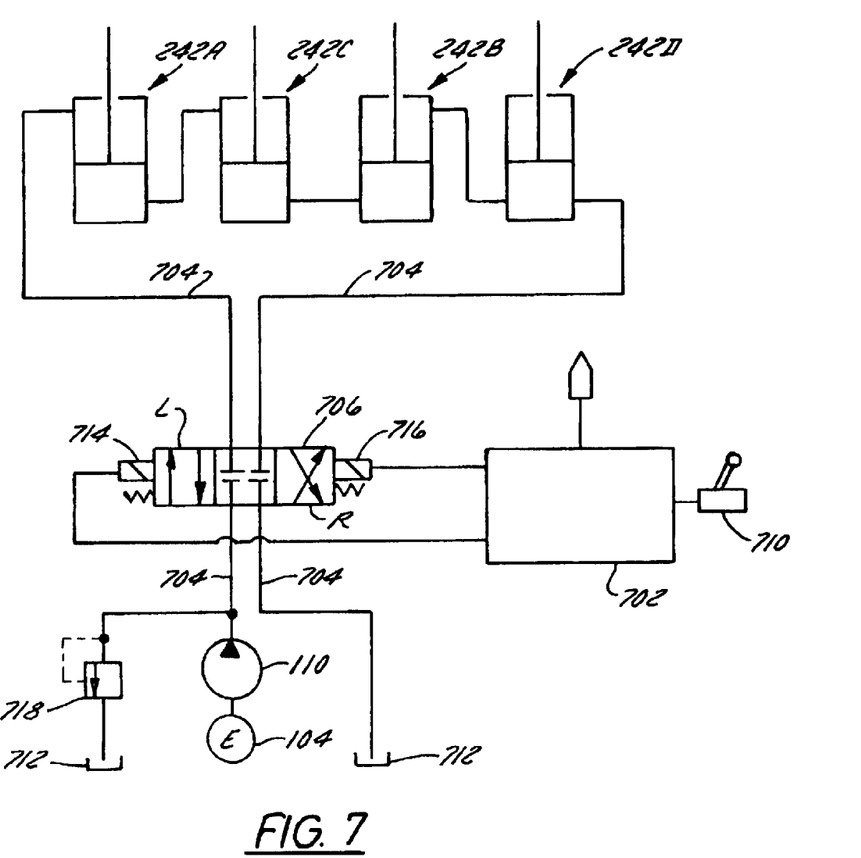
FIG. 7 is a schematic diagram of a hydraulic steering circuit that steers the wheels.

The wheels 102A–D, gear reduction units 246A–D and outer portions of steering knuckles 244A–D all pivot with respect to the control arms 132A–D, respectively and also with respect to the chassis 102 of the vehicle. They do not pivot at random, however, but are pivoted under operator control by four steering actuators 242A–D that are coupled to and between the four control arms 132A–D and the four outer portions 258 of the steering knuckles 244A–D. These actuators 242A–D are preferably dual ported hydraulic cylinders, as best shown in FIG. 7. The four actuators 242 (i.e. 242A–D) can be simultaneously extended or retracted to turn the two pivotable front wheels 102A,B to the left and the two pivotable rear wheels 102C,D to the right, or the front wheels to the right and the rear wheels to the left.

Figure 5:
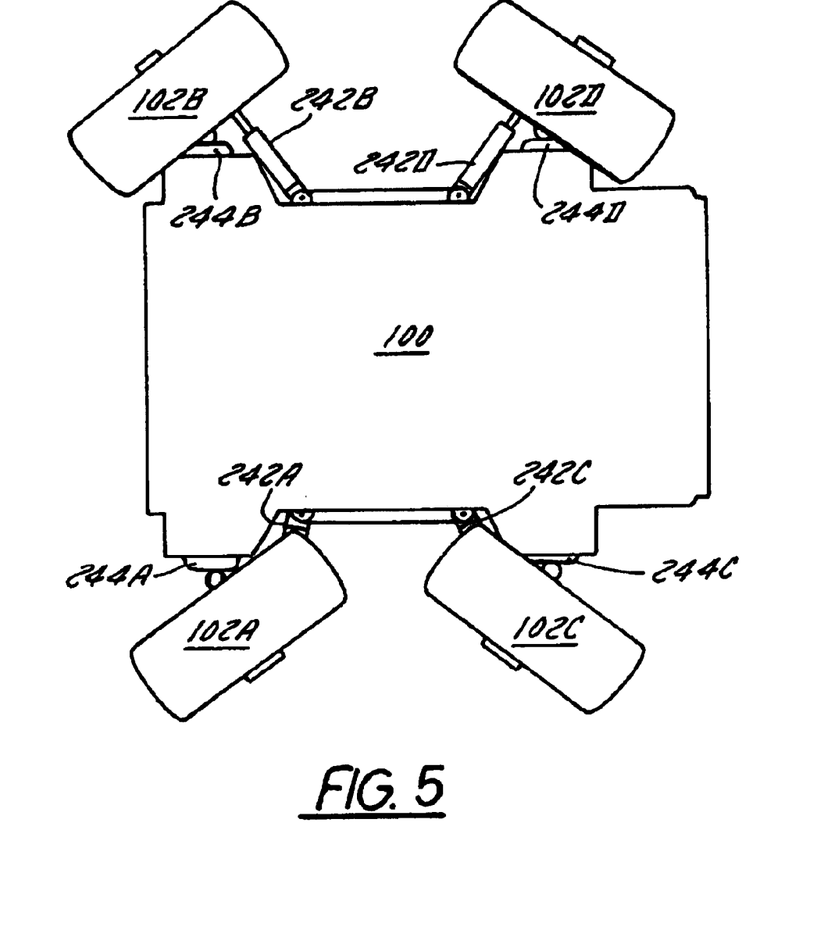
FIG. 5 is a top view of the skid steer vehicle showing the four wheels turned with respect to their control arms and the chassis for a left turn.

FIG. 4 shows the left front suspension in a pivoted position to the right. When steering actuator 242A of the left front suspension is extended, the left front wheel turns to the right, as shown here. The straight ahead position of the left front wheel is shown in FIG. 2, and the left turn position of the left front wheel is shown in FIG. 5. The position shown in FIG. 5 is achieved by retracting the steering actuator 242A associated with the left front wheel.

All the suspensions are mirror images of each other, and the description provided above regarding the left front suspension shown in FIGS. 3 and 4 are equally applicable to the other three suspensions, taking into consideration their mirror relationship to the left front suspension. The rear suspensions are mirror images of the front suspension about a lateral vehicle centerline and the right side suspensions are mirror images of the left side suspensions about a longitudinal vehicle centerline.

To turn the vehicle to the right while traveling forward, the actuators for the left front and the left rear wheels are extended and the actuators for the right front and right rear wheels are retracted. To turn the vehicle to the left while traveling forward, the left front and left rear actuators are retracted and the right front and right rear actuators are extended, The latter configuration is shown in FIG. 5, in which both of the front wheels are turned to the left and both of the rear wheels are turned to the right.

Control System

Figure 6:
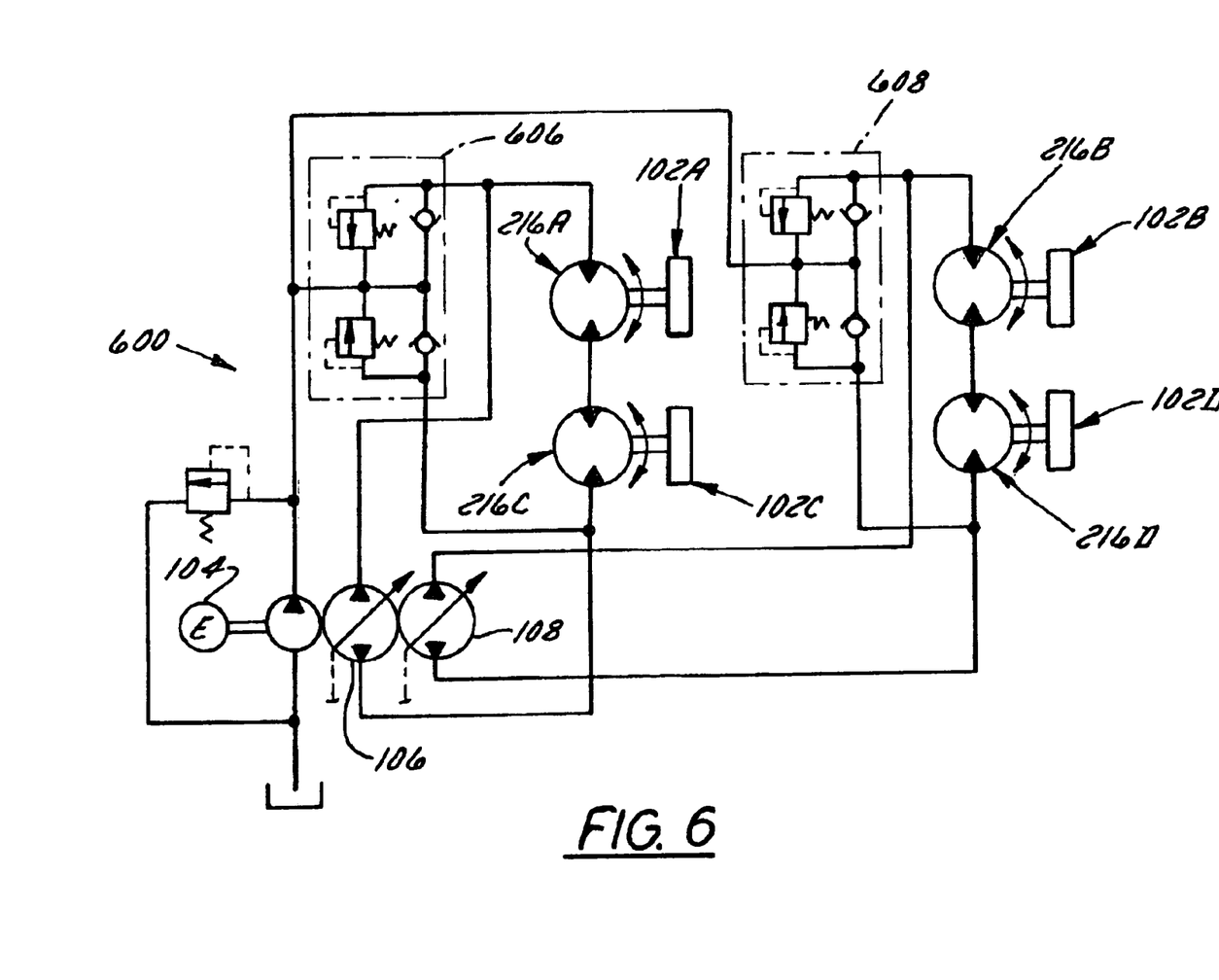
FIG. 6 is a first hydraulic schematic diagram of a hydraulic drive circuit that moves the vehicle over the ground.

FIG. 6 illustrates a first hydraulic drive circuit 600, the circuit that connects pumps 106 and 108 to the four hydraulic motors 216 that are coupled to each of the wheels 102. The first hydraulic circuit 600 is configured to operate the four hydraulic drive motors 216. The wheels are identified as left front wheel 102A, right front wheel 102B, left rear wheel 102C and right rear wheel 102D. The corresponding hydraulic drive motors 216 that drive each of these wheels are indicated as left front hydrostatic motor 216A, right front hydrostatic motor 216B, left rear hydrostatic motor 216C and right rear hydrostatic motor 216D.

Hydraulic drive motors 216A and 216C are connected in series with pump 106 to provide a continuous hydraulic fluid flow circuit from pump 106 through motor 216A then through hydraulic drive motor 216C then back to pump 106, which drives fluid through the cylinders in this direction. In addition, the operator can vary the displacement of pump 106 to drive fluid in the opposite direction through the hydraulic flow path, i.e. pumping fluid from pump 106 through hydraulic drive motor 216C, then through hydraulic drive motor 216A and then back to pump 106. The flow direction and magnitude are controlled electronically by drive controller 702 (FIG. 7) which is coupled to and drives pump 106 and 108.

Pump 108 and hydraulic drive motors 216B and 216D are similarly configured as a continuous bi-directional fluid flow circuit operated by drive controller 702 (FIG. 7) as pump 106 and drive motors 216A and 216C.

The vehicle therefore has two separately controllable hydraulic drive circuits, as shown in FIG. 6. One circuit connects pump 106 and the two hydraulic drive motors 216A,C on one side of the vehicle. Another circuit connects pump 108 and the two hydraulic drive motors 216B,D on the other side of the vehicle. In an alternative arrangement, a single hydraulic drive motor may be provided to drive a wheel or wheels on one side of the vehicle, and a second single hydraulic drive motor may be provided to drive a wheel or wheels on the other side of the vehicle. This can be provided by eliminating one of the motors 216 on each side of the vehicle and replacing it in the hydraulic circuit diagram of FIG. 6 with a hydraulic line.

Drive controller 702 (FIG. 7), which is coupled to pumps 106 and 108, can separately and independently vary the speed and rotational direction of the hydraulic drive motors on opposing sides of the vehicle. This drive system overall is therefore operable to simultaneously drive hydraulic motors on opposing sides of the vehicle in opposite directions and also to drive them in the same direction.

The two hydraulic drive circuits that make up drive circuit 600 include two additional circuit elements 606, 608 that are connected in parallel with the pumps 106, 108, respectively. These circuit elements 606, 608 include overpressure relief valves and hydraulic fluid make-up circuits. Relief and makeup circuit 606 is coupled to the drive circuit for the wheels on the left hand side of the vehicle, including pump 106 and hydraulic drive motors 216A and 216C. Relief and makeup circuit 608 is coupled to the drive circuit for the wheels on the right hand side of the vehicle, including pump 108 and hydraulic drive motors 216B and 216D.

FIG. 7 is a second hydraulic schematic diagram of a hydraulic drive circuit 700 that is driven by the vehicle engine 104. In operation, drive controller 702 drives hydraulic actuators 242 to a position in which all the wheels are pointing straight ahead, as shown in FIG. 1, to a plurality of positions in which the front wheels are turned to the left and the rear wheels are turned to the right, as shown in FIG. 5, and to a plurality of positions in which front wheels are turned to the right and the rear wheels are turned to the left (the mirror image of the positions shown in FIG. 5). The circuit includes hydraulic pump 110, four hydraulic actuators 242A–D that pump 110 supplies fluid to, control valve 706 disposed to control fluid flow from pump 110 to the actuators, supply and return hydraulic lines 704 that couple the elements in the circuit together, drive controller 702 that controls the operator of valve 706, an operator input device 710 that receives operator commands and signals controller 702 to control valve 706 and signals pumps 106 an 108 to vary their displacement (described in FIG. 6 and accompanying text), and a tank 712 that receives fluid from and supplies fluid to the rest of the circuit. Power for the circuit is provided by engine 104, which is coupled to and drives pump 110.

In circuit 700, engine 104 is coupled to and drives the hydraulic pump 110. Pump 110 is supplied with hydraulic fluid from the tank 712 to which it is coupled. Pump 110, in turn, is coupled to and provides pressurized hydraulic fluid to the control valve 706. Valve 706 is a bidirectional proportional control valve using two solenoids 714 and 716 to actuate the valve 706. Solenoids 714 & 716 are used for moving the valve 706 from a neutral position N (the position of valve shown in FIG. 7), to the right position "R" and to the left position "L", respectively.

Drive controller 702 is preferably a digital drive controller including one or more microprocessors or microcontrollers that are coupled together in a network, preferably a CAN bus network in accordance with SAE J1939 to control the devices in the manner described herein. Controller 702 generates signals that it applies to pumps 106 and 108 to control the quantity and direction of fluid flow through the pumps, and generates and applies signals to valve 706 to control the position of the valve and hence fluid flow to the hydraulic actuators 242A–D.

Operator input device 710 may be a single control device such as a single joystick, lever, pedal or switch, or it may be a combination of joysticks, levers, pedals and switches. It is configured to generate signals indicative of a desired direction of travel and speed of travel.

The hydraulic drive circuit 700 also includes an overpressure relief valve 718 that is coupled to and between the pressurized supply line and the tank 712. When the pressure in the hydraulic line exceeds a preset value, the valve opens and dumps the hydraulic fluid to the tank 712.

To operate the vehicle, the operator moves the operator input device to indicate a desired direction of travel. This signal is received by controller 702, which is configured to generate responsive signals that it applies to valve 706 and to pumps 106 and 108.

When the operator manipulates device 710 to request a forward moving right turn, controller 702 is configured to responsively move valve 706 to the right position "R" from the neutral or center position illustrated in FIG. 7. Valve 706 responsively moves and conducts pressurized hydraulic fluid through the hydraulic lines 704 sequentially to the four hydraulic actuators 242, thereby retracting actuators 242B, D, and extending actuators 242A,C. This causes the front wheels of the vehicle to turn to the right and the rear wheels to turn to the left. Controller 702 also signals pumps 106 and 108 to pump fluid in the same direction through the hydraulic drive motors on both sides of the vehicle driving them forward and the vehicle forward over the ground. With the wheels in the aforementioned turned position and the vehicle moving forward, the vehicle will turn to the right. This permits the vehicle to turn with minimal (if any) skidding.

When the operator manipulates device 710 to request a forward moving left turn, controller 702 is configured to responsively move valve 706 to the left position "L" from the neutral or center position illustrated in FIG. 7. Valve 706 responsively moves and conducts pressurized hydraulic fluid through the hydraulic lines 704 sequentially to the four hydraulic actuators 242, extending actuators 242B,D, and retracting actuators 242A,C. This causes the front wheels of the vehicle to turn to the left and the rear wheels to turn to the right, Controller 702 also signals pumps 106 and 108 to pump fluid in the same direction through the hydraulic drive motors on both sides of the vehicle driving them forward and moving the vehicle forward over the ground. With the wheels in the aforementioned turned position and the vehicle moving forward, the vehicle will turn to the left. This permits the vehicle to turn with minimal (if any) skidding.

When the operator manipulates device 710 to request a turn-in-place, controller 702 moves wheels 102A–D to turn straight ahead and signals pumps 106 and 108 to apply fluid flow to the hydraulic drive motors in opposite directions, the wheels turning one direction on one side of the vehicle and turning in the other direction on the opposite side of the vehicle. This causes the vehicle to skid steer, and turn in place.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. A skid steer vehicle comprising:
   a chassis having a right side, a left side, a front end, and a rear end;
   an engine mounted on the chassis;
   two steerable front wheels operably connected to the front end of the chassis, wherein one of the two steerable front wheels is on the right side of the chassis and another of the two steerable front wheels is on the left side of the chassis;
   two steerable rear wheels operably connected to the rear end of the chassis, wherein one of the two steerable rear wheels is on the right side of the chassis and another of the two steerable rear wheels is on the left side of the chassis;
   at least one steering actuator operably connected to the four steerable front and rear wheels to steer said wheels with respect to the chassis;
   at least one hydraulic drive motor operably connected to at least one of the right side wheels;
   at least another hydraulic drive motor operably connected to at least one of the left side wheels;
   a first hydraulic circuit configured to operate said at least one and said at least another hydraulic drive motors, wherein the first hydraulic circuit is operable (1) to simultaneously drive said at least one hydraulic drive motor in a forward direction and said at least another hydraulic motor in a backward direction, (2) to simultaneously drive said at least one and said at least another hydraulic motors in a forward direction, and (3) to simultaneously drive said at least one and said at least another hydraulic motors in a backward direction; and
   a second hydraulic circuit configured to drive said at least one steering actuator to a first position and to a second position, wherein in said first position the two steerable front wheels are turned left and the two steerable rear wheels are turned right, and wherein in said second position the two steerable front wheels are turned right and the two steerable rear wheels are turned left.

2. The skid steer vehicle of claim 1, wherein said at least one steering actuator includes four steering actuators wherein each of said four steering actuators is coupled to a corresponding one of said four steerable wheels.

3. The skid steer vehicle of claim 2, wherein the four steering actuators are hydraulic cylinders.

4. The skid steer vehicle of claim 1, wherein said at least one and said at least another hydraulic motors include four hydraulic motors, each of said four hydraulic motors being drivingly coupled to a corresponding one of said four steerable wheels.

5. The skid steer vehicle of claim 1, further comprising four gear reduction units, each of said four gear reduction units being drivingly coupled to an associated one of said four steerable wheels.

6. The skid steer vehicle of claim 5, further comprising four wheel hubs drivingly coupled to each of said four steerable wheels, and further wherein each of said four gear reduction units is disposed in a corresponding one of said four wheel hubs.

7. The skid steer vehicle of claim 1, further comprising four steering knuckles each of said four knuckles being coupled to and steerably supporting one of said four steerable wheels.

8. The skid steer vehicle of claim 1, further comprising:
   two forward control arms disposed on opposing sides of the chassis, each of said forward arms having a fixed end pivotally coupled to the chassis and a free end extending forward from said fixed end;
   two rear control arms disposed on opposing sides of said chassis, each of said rear control arms having a fixed end pivotally coupled to the chassis and a free end extending rearward from said fixed end; and
   four steering knuckles, each knuckle coupled to a corresponding free end of said four control arms, wherein each of said four wheels are steerably coupled to a corresponding one of the steering knuckles.

9. A skid steer vehicle comprising:
   a chassis having a right side, a left side, a front end, and a rear end;
   an engine mounted on the chassis;
   four independent suspensions coupled to the chassis wherein the four independent suspensions include:
      a spring having a first end coupled to the chassis and a second end;
      a control arm having first and second ends and extending fore-and-aft along said vehicle chassis, and being coupled at said first end of said arm to the chassis and to said second end of said spring;
      a steering knuckle coupled to the second end of the control arm; and
      a wheel coupled to the steering knuckle.

10. The skid steer vehicle of claim 9, further comprising:
   at least a first hydraulic motor drivingly coupled to a first pair of said four wheels, said first pair being disposed on the left side of the vehicle; and
   at least a second hydraulic motor drivingly coupled to a second pair of said four wheels, said second pair being disposed on the right side of the vehicle.

11. The skid steer vehicle of claim 10 further comprising:
   a drive controller operably coupled to said at least a first and said at least a second hydraulic motors (1) to simultaneously drive said first and second pair of wheels forward, (2) to simultaneously drive said first and second pairs of wheels in reverse, (3) to simultaneously drive said first pairs of wheels forward and said second pair of wheels in reverse, and (4) to simultaneously drive said first pairs of wheels in reverse and said second pair of wheels forward.

12. The skid steer vehicle of claim 11, wherein the drive controller is configured to (1) steer a front pair of said first and second pairs of wheels to the left and to steer a rear pair of said first and second pairs of wheels to the right, and (2) to steer said front pair of said first and second pairs of wheels to the right and to steer said rear pair of said first and second pairs of wheels to the left.

13. The skid steer vehicle of claim 12, wherein a front pair of the four control arms is pivotally coupled to the chassis on opposing sides of the vehicle and extend horizontally forward to their respective second ends and wherein a rear two of the four control arms is pivotally coupled to the chassis on opposing sides of the vehicle and extend rearward to their respective second ends.

14. The skid steer vehicle of claim 13, further comprising four gear reduction units, each of said four gear reduction units being rotationally coupled to a corresponding one of said four wheels.

15. The skid steer vehicle of claim 14, wherein each of said four gear reduction units is coupled to a corresponding one of said four steering knuckles to be steered thereby.

16. The skid steer vehicle of claim 9, wherein the spring includes a torsion bar.

17. The skid steer vehicle of claim 16, wherein the torsion bar is coupled to and between the control arm and the chassis.

18. The skid steer vehicle of claim 9, wherein the spring includes a hydraulic cylinder responsive to a gas charge in an accumulator.

19. The skid steer vehicle of claim 18, wherein the hydraulic cylinder is coupled to and between the control arm and the chassis.

* * * * *